United States Patent
Lin et al.

(10) Patent No.: US 11,644,726 B1
(45) Date of Patent: May 9, 2023

(54) DISPLAY DEVICE WITH SIGNAL LINE PROTRUSION CORRESPONDING TO COMMON ELECTRODE LINE BEND SEGMENT

(71) Applicant: Au Optronics Corporation, Hsinchu (TW)

(72) Inventors: Hung-Che Lin, Hsinchu (TW); Yi-Chu Wang, Hsinchu (TW); Chien-Huang Liao, Hsinchu (TW); Yi-Tse Lin, Hsinchu (TW); Fu-ming Yu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/703,896

(22) Filed: Mar. 24, 2022

(30) Foreign Application Priority Data

Nov. 1, 2021 (TW) .................................. 110140610

(51) Int. Cl.
*G02F 1/1362* (2006.01)
*G02F 1/1343* (2006.01)

(52) U.S. Cl.
CPC .... *G02F 1/136286* (2013.01); *G02F 1/13439* (2013.01); *G02F 1/134327* (2013.01); *G02F 1/134345* (2021.01)

(58) Field of Classification Search
None
See application file for complete search history.

(56) References Cited

U.S. PATENT DOCUMENTS

| | | | |
|---|---|---|---|
| 10,295,866 B2 | 5/2019 | Chang et al. | |
| 10,824,021 B2 | 11/2020 | Chang et al. | |
| 2005/0117103 A1* | 6/2005 | Son | G02F 1/136286 349/141 |
| 2008/0284965 A1* | 11/2008 | Ryu | G02F 1/134363 349/141 |
| 2013/0033654 A1* | 2/2013 | Kim | G02F 1/136209 349/143 |
| 2015/0009443 A1* | 1/2015 | Song | H01L 27/1248 349/43 |

(Continued)

FOREIGN PATENT DOCUMENTS

| | | |
|---|---|---|
| CN | 101145568 | 3/2008 |
| CN | 101706635 | 5/2010 |

(Continued)

*Primary Examiner* — Ryan Crockett
(74) *Attorney, Agent, or Firm* — JCIPRNET

(57) ABSTRACT

A display device includes two adjacent pixel electrodes spaced apart from each other by a gap extending in a first direction, at least one signal line extending in the first direction and having at least one protrusion at at least one side thereof, and two adjacent common electrode lines spaced apart from each other. The orthogonal projection of one/the other common electrode line on the substrate is located between the orthogonal projection of the signal line on the substrate and the orthogonal projection of one/the other pixel electrode on the substrate. Each common electrode line has a bend segment bending away from the signal line, wherein the protrusion of the at least one signal line positionally corresponds to the bend segment of each common electrode line, and the length of the protrusion is not larger than the length of the bend segment.

18 Claims, 14 Drawing Sheets

(56) References Cited

U.S. PATENT DOCUMENTS

| | | | | |
|---|---|---|---|---|
| 2016/0349587 | A1* | 12/2016 | Park | G02F 1/136286 |
| 2017/0357129 | A1* | 12/2017 | Chang | G02F 1/134309 |
| 2018/0231853 | A1* | 8/2018 | Yamamoto | G02F 1/13338 |
| 2019/0250468 | A1 | 8/2019 | Chang et al. | |
| 2020/0272010 | A1* | 8/2020 | Lee | G02F 1/136286 |
| 2021/0028193 | A1* | 1/2021 | Yang | H01L 27/124 |

FOREIGN PATENT DOCUMENTS

| | | |
|---|---|---|
| CN | 107490907 | 12/2017 |
| CN | 111208683 | 5/2020 |

* cited by examiner

DISPLAY DEVICE WITH SIGNAL LINE PROTRUSION CORRESPONDING TO COMMON ELECTRODE LINE BEND SEGMENT

CROSS-REFERENCE TO RELATED APPLICATION

This application claims priority benefits of Taiwan patent application serial no. 110140610, filed on Nov. 1, 2021. The entirety of the above-mentioned patent application is hereby incorporated by reference herein and made a part of this specification.

FIELD OF THE INVENTION

This invention relates to a display device.

DESCRIPTION OF RELATED ART

A liquid crystal display device uses a backlight module as a light source and orientates liquid crystal molecules by electric field to control each pixel of the liquid crystal panel to pass or block the light emitted from the backlight module. In order to increase the aperture ratio of liquid crystal panel, common electrode lines are arranged to cross data lines in the wiring area for electrical connection in some pixel designs. However, the common electrode lines crossing the data lines cause instability in orientation of liquid crystal molecules to generate nodes in random, so that display defects such as disclination lines easily occur at edges of the pixel area. As the wiring area becomes narrower and narrower, disclination lines will be more easily seen to lower the display quality.

SUMMARY OF THE INVENTION

This invention provides a display device that has good display quality.

The display device according to an embodiment of this invention includes two adjacent pixel electrodes, at least one signal line, and two adjacent common electrode lines. The two adjacent pixel electrodes are disposed on a substrate and spaced apart from each other by a gap extending in a first direction, the width of the gap in a second direction is smaller than a half of the width of any one of the two adjacent pixel electrodes in the second direction, and the second direction crosses the first direction. The at least one signal line is disposed on the substrate and extends in the first direction, wherein the orthogonal projection of the at least one signal line on the substrate falls within the orthogonal projection of the gap on the substrate, the at least one signal line is electrically connected with at least one of the two adjacent pixel electrodes, the at least one signal line has at least one protrusion at at least one side thereof, and the at least one protrusion protrudes in a direction away from the at least one signal line. The two adjacent common electrode lines are disposed on the substrate, wherein the orthogonal projection of one of the two adjacent common electrode lines on the substrate is located between the orthogonal projection of the at least one signal line on the substrate and the orthogonal projection of one of the two adjacent pixel electrodes on the substrate, the orthogonal projection of the other of the two adjacent common electrode lines on the substrate is located between the orthogonal projection of the at least one signal line on the substrate and the orthogonal projection of the other of the two adjacent pixel electrodes on the substrate, the two adjacent common electrode lines are spaced apart from each other and extend in the first direction, and each of the two adjacent common electrode lines includes a first segment, a second segment, and a bend segment located between and connecting with the first segment and the second segment, wherein the bend segment bends away from the at least one signal line, the at least one protrusion positionally corresponds to the bend segment of each of the two adjacent common electrode lines, and the length of the at least one protrusion is not larger than the length of the bend segment.

In an embodiment of this invention, the two ends of the bend segment are connected with an end of the first segment and an end of the second segment, respectively, at a first connection point and a second connection point, respectively, and the length of the bend segment is a length A of a first linking line linking the first connection point and the second connection point in the first direction, and the length A of the first linking line and the length a of the at least one protrusion in the first direction satisfy 4 µm≤a≤A30 µm.

In an embodiment of this invention, the bend segment includes two first inclined sections, and a first sub-segment located between and connecting with the two first inclined sections, wherein the first distance b between the side of the first sub-segment facing the at least one signal line and the first linking line in the second direction satisfies 1.5 µm<b≤6 µm.

In an embodiment of this invention, the width c of the at least one protrusion in the second direction satisfies 0.25 µm≤c≤2b.

In an embodiment of this invention, a division line extending in the second direction and passing the bend segment divides the length A of the first linking line into a first length d and a second length e, and the length A, the first length d and the second length e satisfy A=d+e, 0<d≤15 µm, and 0<e≤15 µm.

In an embodiment of this invention, the division line passes the at least one protrusion in top view.

In an embodiment of this invention, the first length d is not equal to the second length e.

In an embodiment of this invention, the first length d is equal to the second length e.

In an embodiment of this invention, at least one of the two adjacent pixel electrode has a plurality of slits therein and includes a trunk extending in the second direction, and the division line passes the trunk in top view.

In an embodiment of this invention, the division line coincides with a central axis of the trunk in top view.

In an embodiment of this invention, the at least one protrusion comprises a plurality of protrusions, and the protrusions positionally correspond to the bend segment of each of the two adjacent common electrode lines.

In an embodiment of this invention, the protrusions are arranged at two sides of the at least one signal line.

In an embodiment of this invention, at least one of the two adjacent pixel electrode has a plurality of slits therein.

In an embodiment of this invention, the bend segment further comprises two second inclined sections and two connection sections, wherein one of the two connection sections is located between and connects one of the first inclined sections and one of the second inclined sections, the other of the two connection sections is located between and connects the other of the first inclined sections and the other of the second inclined sections, one of two ends of the first sub-segment is connected with one of the first inclined sections via one of the second inclined sections and one of the connection sections, and the other of the two ends of the first sub-segment is connected with the other of the first inclined sections via the other of the second inclined sections and the other of the connection sections.

In an embodiment of this invention, the at least one signal line is at least one data line.

In an embodiment of this invention, the orthogonal projections of the two adjacent common electrode lines on the substrate are located outside of the orthogonal projections of the two adjacent pixel electrodes on the substrate.

In an embodiment of this invention, the orthogonal projections of the two adjacent common electrode lines on the substrate partially overlap with the orthogonal projections of the two adjacent pixel electrodes on the substrate.

In an embodiment of this invention, the two adjacent common electrode lines are electrically connected with other.

In order to make the above-mentioned features and merits of this invention clearer and more understandable, exemplary embodiments are described in details below in accompany with the attached drawings.

DESCRIPTION OF THE EMBODIMENTS

Figure 1A:
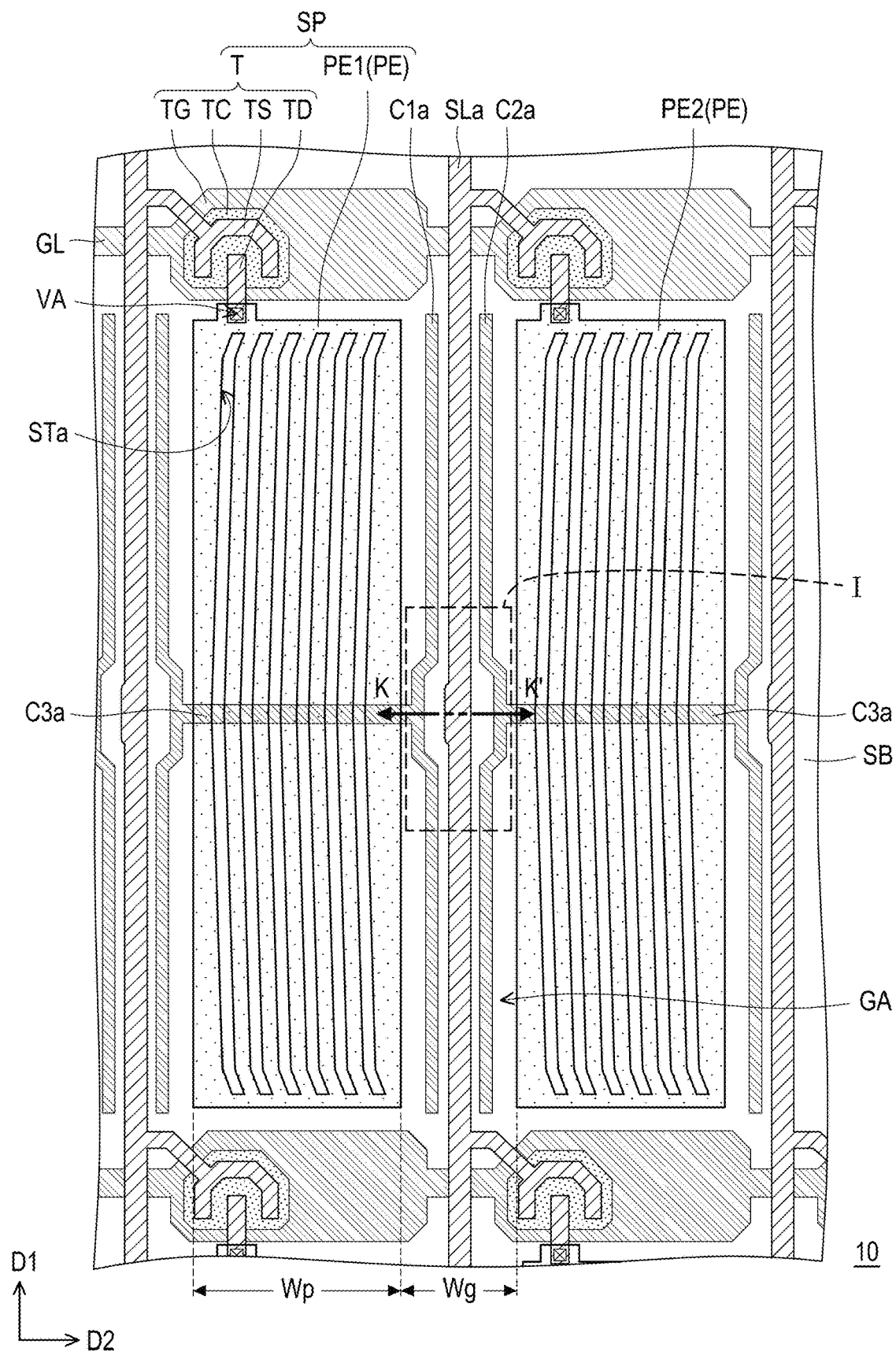
FIG. 1A illustrates a schematic local plan view of the display device 10 according to an embodiment of this invention.

In the accompanying drawings, the thickness of a layer, a film, a substrate or a region in an entire structure may be enlarged for clarity. Identical reference characters represent identical elements throughout the specification. It should be understood that when an element such as a layer, a film, a region or a substrate is described to be "on" or "connected with" another element, the element may be directly on or directly connected with another element, or an intermediate element may be present. On the contrary, when an element is described to be "directly on" or "directly connected with" another element, no intermediate element is present. As seen in this disclosure, the term "connection" means physical and/or electrical connection, and "electrical connection" or "coupling" allows other element(s) to be present between two elements.

It should be understood that, although the terms "first", "second" and "third", etc. are used in this disclosure to describe various elements, members, regions, layers and/or portions, the elements, members, regions, layers and/or portions are not limited by the terms, and the terms are just used to distinguish an element, a member, a region, a layer or a portion from another one. Hence, for example, a first element, member, region, layer or portion discussed below may be alternatively called a second element, member, region, layer or portion without departing from the teaching of this disclosure.

The terms used in this disclosure are merely for describing specific embodiments but not for limitation. As seen in this disclosure, unless clearly indicated, the singular forms "a", "an" and "the" are intended to include the plural forms including "at least one" and "and/or". As used herein, the scope of the term "and/or" includes any and all combinations of one or more of the associated listed items. It should also be understood that, when used in this specification, the terms "comprise" and/or "include" designate presence of stated features, regions, integrals, steps, operations, elements and/or parts, but do not exclude presence or addition of one or more other features, regions, integers, steps, operations, elements, parts and/or combinations thereof.

Furthermore, relative terms such as "lower" or "bottom" and "upper" or "top" may be used herein to describe one element's relationship to another element, as shown in the drawing. It should be understood that relative terms are intended to encompass different orientations of the device in addition to the orientation shown in the drawings. For example, if a device in a figure is turned over, an element having been described as being at the "lower" side of another element would then be oriented at the "upper" side of the another element. Thus, the exemplary term lower may include an orientation of "lower" and an orientation of "upper", depending on the particular orientation of the figure. Similarly, if a device in a figure is turned over, an element having been described as being "under" another element would then be "above" the another element. Thus, the exemplary term "under" may include an orientation of "under" and an orientation of "above".

As used herein, the scope of "about", "approximately" or "substantially" includes the stated value and a value within the acceptable deviation of the stated value as determined by one of ordinary skill in the art. For example, "about" may mean being within the range of one or more standard deviations from the stated value, or being ±30%, ±20%, ±10% or ±5% of the stated value. Furthermore, when "about", "approximately" car "substantially" is used here, a more acceptable range of deviation or standard deviation can be selected according to the optical property, etching property or other property, without applying one deviation to all properties.

Exemplary embodiments are described herein with reference to schematic illustrations of idealized embodiments. Thus, variations in the shapes in the illustrations as a result of, for example, manufacturing techniques and/or tolerances, are to be expected. Accordingly, the embodiments described herein should not be construed as being limited to the particular shapes of regions as shown herein, but rather include deviations in shapes resulting from, for example, manufacturing. For example, regions illustrated or described as flat may typically have rough and/or nonlinear features. Additionally, an acute angle shown may be rounded. Thus, the regions illustrated in the drawings are schematic in nature and their shapes are not intended to illustrate the precise shapes of regions and are not intended to limit the scope of the claims.

Figure 1B:
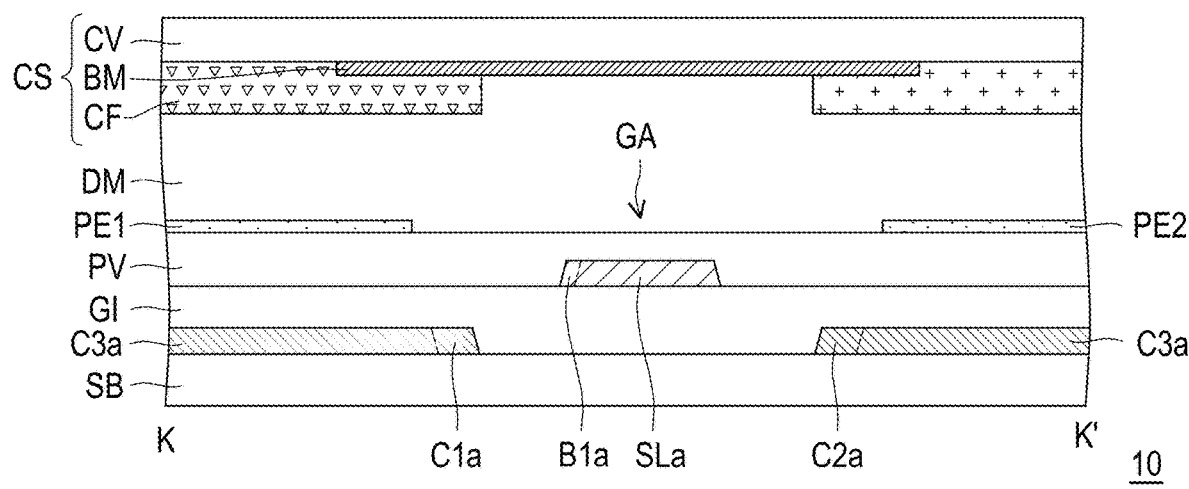
FIG. 1B illustrates a schematic cross-sectional view of the display device 10 along line K-K' shown in FIG. 1A.
Figure 1C:
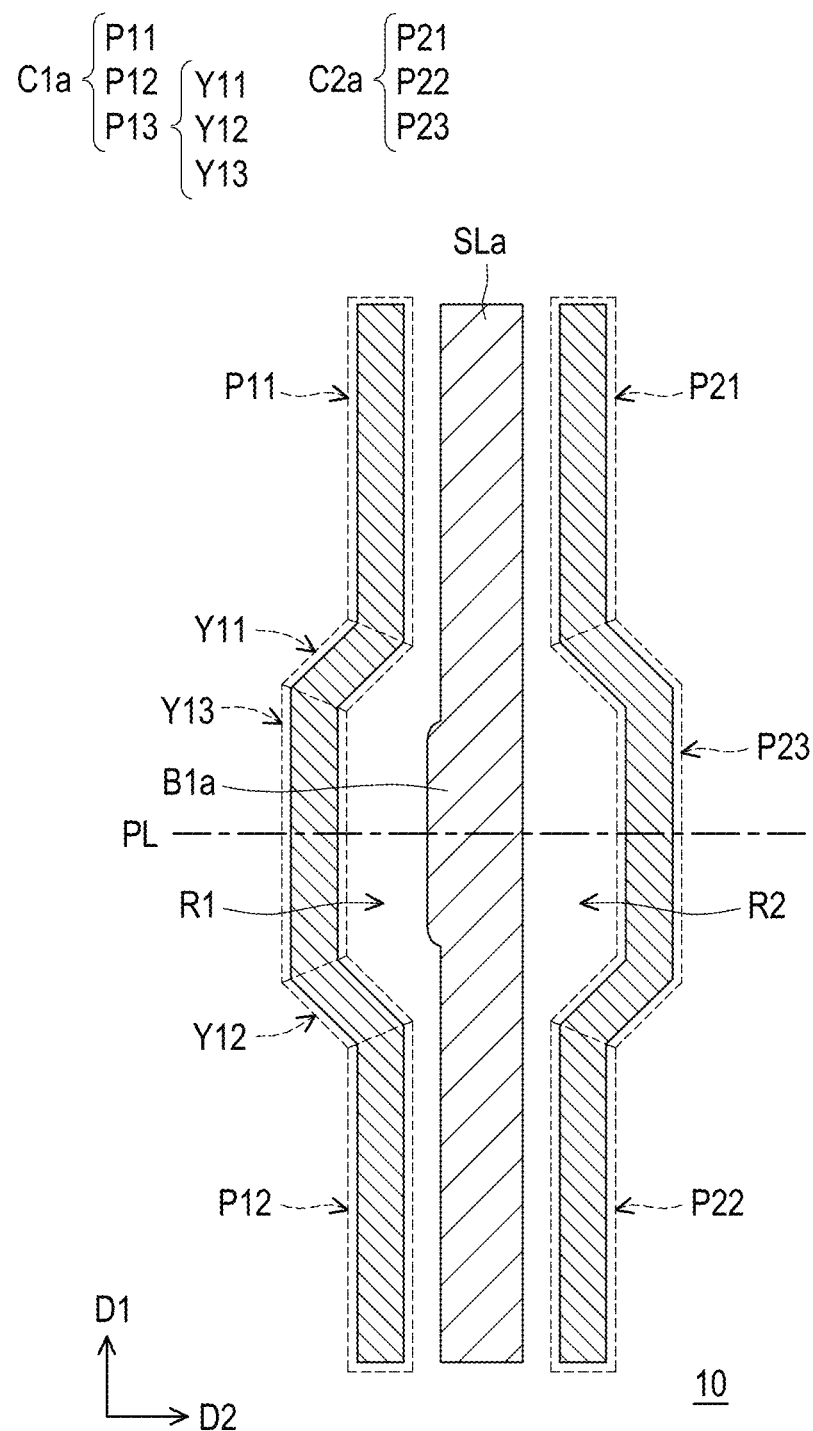
FIG. 1C illustrates a schematic magnified view of the area I of the display device 10 as shown in FIG. 1A.

FIG. 1A illustrates a schematic local plan view of the display device 10 according to an embodiment of this invention. FIG. 1B illustrates a schematic cross-sectional view of the display device 10 along line K-K' shown in FIG. 1A. FIG. 1C illustrates a schematic magnified view of the area I of the display device 10 as shown in FIG. 1A. To make the expressions of figures more concise, the films/members such as the gate insulating layer GI, the planarization layer PV, the display medium DM and the filter substrate CS are omitted in FIG. 1A, and FIG. 1C only depicts a signal line SLa and common electrode lines C1a and C2a. Embodiments of the respective elements of the display device 10 will be described below in reference of FIGS. 1A to 1C, but this invention is not limited thereto.

Referring to FIG. 1A, the display device 10 includes a substrate SB, a plurality of signal lines SLa, a plurality of common electrode lines C1a and C2a, and a plurality of sub-pixels SP. The signal lines SLa and the common electrode lines C1a and C2a are disposed on the substrate SB, and extend in the first direction D1. Each sub-pixel SP includes a switching element T and a pixel electrode PE, wherein the switching element T is electrically connected with a corresponding signal line SLa, and the pixel electrode PE is electrically connected with the switching element T. That is, the signal line SLa can be electrically connected with the pixel electrode PE via the switching element T.

The substrate SB of the display device 10 may be a transparent substrate, which may include quartz, glass or polymer, but this invention is not limited thereto. Various films/layers for forming signal lines, active elements, passive elements, storage capacitances and so on can be formed over the substrate SB.

Referring FIG. 1B, the display device 10 may also include a filter substrate CS, and a display medium DM arranged between the filter substrate CS and the substrate SB. For example, the filter substrate CS may include a transparent cover CV, color filter structures CF and a light-shielding structure BM. The color filter structures CF and the light-shielding structure BM may be formed on the surface of the transparent cover CV facing the display medium DM. The light-shielding structure BM may be located between the color filter structures CF. The color filter structures CF may correspond to a plurality of sub-pixels SP. In some embodiments, the color filter structures CF include red filter structures, green filter structures and blue filter structures to allow the display device 10 to provide full-color display effect. In addition, the display medium DM may include liquid crystal molecules, for example.

In this embodiment, the display device 10 may also include a plurality of scan lines GL, which may extend in the second direction D2 crossing the first direction D1. The switching element T of each sub-pixel SP may be electrically connected to a corresponding scan line GL.

For example, in this embodiment, the switching element T includes a semiconductor layer TC, a gate electrode TG, a source TS and a drain TD. The region of the semiconductor layer TC overlapping with the gate electrode TG can be considered as a channel region of the switching element T. The gate electrode TG is electrically connected to a corresponding scan line GL, and they both may belong to the same film. The source TS is electrically connected to a corresponding signal line SLa, the source TS, the drain TD and the signal line SLa may belong to the same film, and the signal line SLa may be used as a data line, but this invention is not limited thereto. The semiconductor layer TC may include a silicon semiconductor material (e.g., polysilicon, or amorphous silicon, etc.), an oxide semiconductor material, or an organic semiconductor material, but is not limited thereto. Examples of the materials of the gate electrodes TG, the sources TS, the drains TD, the signal lines SLa and the scan lines GL include: metals such as Cr, Au, Ag, Cu, Sn, Pb, Hf, W, Mo, Nd, Ti, Ta, Al and Zn, alloys of these metals, oxides of these metals, nitrides of these metals, combinations of the aforementioned materials, and other electrically conductive materials, but this invention is not limited thereto.

The source TS and the drain TD of the switching element T are electrically connected with the semiconductor layer TC by, for example, contacting with the semiconductor layer TC. In this embodiment, the switching element T is illustrated to be a bottom-gate thin-film transistor (TFT), but this invention is not limited thereto. In other embodiments, the gate electrode TG may alternatively be arranged over the semiconductor layer TC so that the switching element T becomes a top-gate TFT. In addition, an ohmic contact layer may optionally disposed between each of the source TS and the drain TD and the semiconductor layer TC to improve the electrical conduction between each of the source TS or the drain TD and the semiconductor layer TC.

The drain TD of the switching element T may be electrically connected with the pixel electrode PE through a via VA, so that while the switching element T is turned on by a signal transmitted from the corresponding scan line GL, the signal carried on the signal line SLa is transmitted to the pixel electrode PE.

In this embodiment, two adjacent pixel electrodes PE1 and PE2 on the substrate SB are spaced apart from each other, and there is a gap GA extending in the first direction D1 between the two pixel electrodes PE1 and PE2. The pixel electrodes PE1 and PE2 may have the same dimensions. For example, when the pixel electrode PE1 or PE2 has a width Wp in the second direction D2, the width Wg of the gap GA is smaller than the width Wp of the pixel electrode PE1 or PE2. In some embodiments, the width Wg of the gap GA is smaller than a half of the width Wp of the pixel electrode PE1 or PE2.

In this embodiment, the pixel electrodes PE1 and PE2 may be electrically connected to different signal lines SLa, but this invention is not limited thereto. In some other embodiment, the pixel electrodes PE1 and PE2 may be electrically connected to the same signal line SLa. In some embodiments, one or each of the pixel electrodes PE1 and PE2 has a plurality of slits STa therein, and the slits STa have parallel strip contours substantially extending in the first direction D1. When being driven, the electric field formed between the pixel electrode PE1 or PE2 and the common electrode (not shown) can pass through the slits STa in the pixel electrode PE1 or PE2 to drive the display medium DM.

Referring to both FIG. 1A and FIG. 1C, the orthogonal projection of the signal line SLa on the substrate SB may fall within the orthogonal projection of the gap GA on the substrate SB, and a side of the signal line SLa has at least one protrusion B1a protruding in a direction away from the signal line SLa. For example, in this embodiment, forming only one protrusion B1a protruding toward the common electrode line C1a is possible, but this invention is not limited thereto. In some embodiments, a plurality of protrusions B1a protruding toward the common electrode line C1a may be formed. In some other embodiment, one or more protrusions B1a protruding toward the common electrode line C2a may be formed.

In this embodiment, the common electrode lines C1a and C2a may be disposed on the substrate SB, the gate insulating layer GI may be interposed between the signal line SLa and the common electrode lines C1a and C2a, the planarization layer PV may be interposed between the signal line SLa and the pixel electrodes PE1 and PE2, and the display medium DM may be arranged between the pixel electrodes PE1 and PE2 and the filter substrate CS. The orthogonal projections of the common electrode lines C1a and C2a on the substrate SB may fall within the orthogonal projection of the gap GA on the substrate SB; in other words, the orthogonal projections of the common electrode lines C1a and C2a on the substrate SB may be outside of the orthogonal projections of the pixel electrodes PE1 and PE2 on the substrate SB. Moreover, the common electrode lines C1a and C2a may be spaced apart from each other such that their orthogonal projections on the substrate SB are respectively located on two sides of the orthogonal projection of the signal line SLa on the substrate SB. Specifically, it is possible that the orthogonal projection of the common electrode line C1a on the substrate SB is between the orthogonal projection of the pixel electrode PE1 on the substrate SB and the orthogonal projection of the signal line SLa on the substrate SB, and the orthogonal projection of the common electrode line C2a on the substrate SB is between the orthogonal projection of the pixel electrode PE2 on the substrate SB and the orthogonal projection of the signal line SLa on the substrate SB.

In this embodiment, a part of each of the common electrode lines C1a and C2a may be bent away from the signal line SLa, and the shapes of the common electrode lines C1a and C2a may be substantially symmetric to each other with the signal line SLa as a symmetry axis. For example, the common electrode line C1a may include a first segment P11, a second segment P12, and a bend segment P13 that is arranged between and connected with the first segment P11 and the second segment P12. In addition, the bend segment P13 is bent away from the signal line SLa, so that the bend segment P13 has a groove shape with a notch facing the signal line SLa and the opening of the groove R1 formed by the bend segment P13 correspond to the protrusion B1a. In other words, the groove R1 can accommodate the protrusion B1a.

Similarly, the common electrode line C2a may include a first segment P21, a second segment P22, and a bend segment P23 that is arranged between and connected with the first segment P21 and the second segment P22. In addition, the bend segment P23 is bent away from the signal line SLa, so that the bend segment P23 has a groove shape with a notch facing the signal line SLa, and the groove R2 formed by the bend segment P23 may be substantially symmetric to the groove R1 formed by the bend segment P13 with the signal line SLa as a symmetry axis.

In some embodiments, the common electrode lines C1a and C2a may be connected by a common electrode line C3a, wherein the orthogonal projection of the common electrode line C3a on the substrate SB overlaps with the orthogonal projection of the pixel electrode PE1 or PE2 on the substrate SB but does not overlap with the orthogonal projection of the signal line SLa on the substrate SB. In other words, the common electrode line C3a does not cross under the signal line SLa.

In the display device 10 according to an embodiment of this invention, by forming the protrusion B1a at a side of the signal line SLa, forming the portions of the common electrode lines C1a and C2a positionally corresponding to the protrusion B1a into the outward expanding bend segments P13 and P23, and spacing apart the common electrode lines C1a and C2a between the pixel electrodes PE1 and PE2, the orientation of the liquid crystal molecules can be stabilized, so that the display device 10 can have good display quality.

Other embodiments of this invention will be described below in reference of FIGS. 2 to 6, wherein the reference characters of elements and related contents in the embodiment as shown in FIGS. 1A to 1C are continued to be used, identical or similar reference characters are used to represent identical or similar elements, and descriptions of identical technical contents are omitted. The omitted descriptions may refer to the embodiment as shown in FIGS. 1A to 1C.

Figure 2:
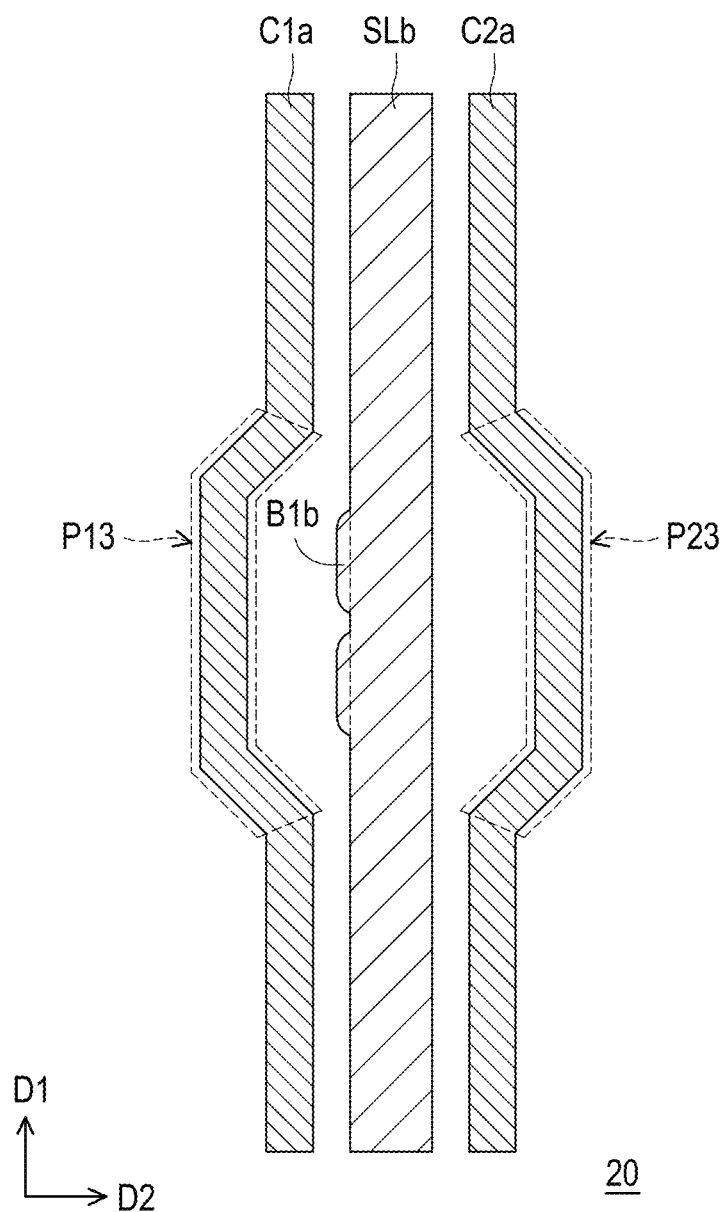
FIG. 2 illustrates a schematic local plan view of the signal line SLb and the common electrode lines C1a and C2a of the display device 20 according to an embodiment of this invention.

FIG. 2 illustrates a schematic local plan view of the signal line SLb and the common electrode lines C1a and C2a of a display device 20 according to an embodiment of this invention. Compared to the display device 10 as shown in FIGS. 1A to 1C, the display device 20 as shown in FIG. 2 is different in that one side of the signal line SLb has two protrusions B1b protruding in a direction away from the signal line SLb.

For example, the two protrusions B1b may protrude toward the common electrode line C1a as in this embodiment, but this invention is not limited thereto. In other embodiments, the two protrusions B1b may alternatively protrude toward the common electrode line C2a.

In the display device 20 according to an embodiment of this invention, by forming the two protrusions B1b at one side of the signal line SLb, forming the portions of the common electrode lines C1a and C2a positionally corresponding to the two protrusions B1b into the outward expanding bend segments P13 and P23, and spacing apart the common electrode lines C1a and C2a between the pixel electrodes, the orientation of the liquid crystal molecules can be stabilized, so that the display device 20 can have good display quality.

Figure 3A:
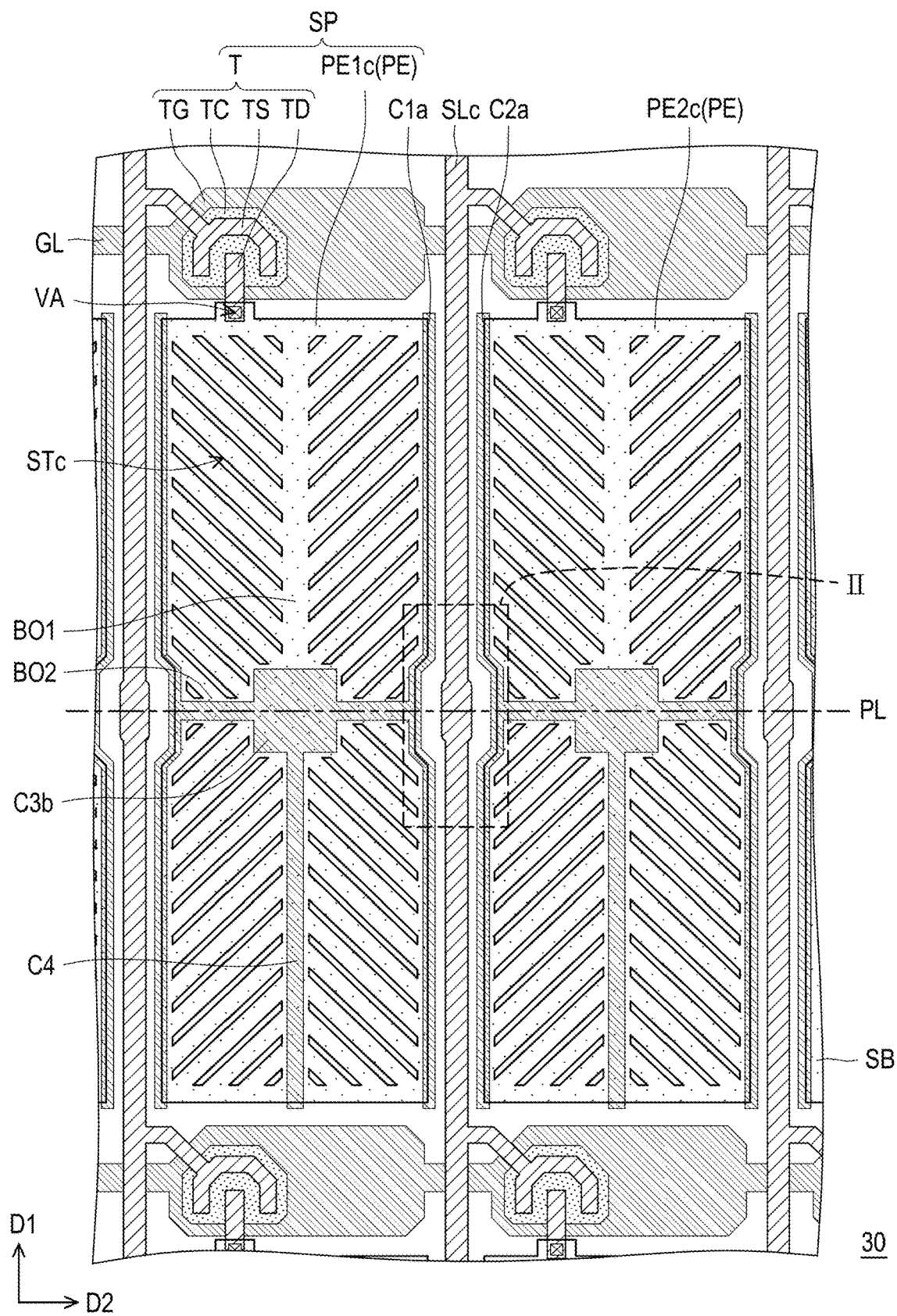
FIG. 3A illustrates a schematic local plan view of the display device 30 according to an embodiment of this invention.
Figure 3B:
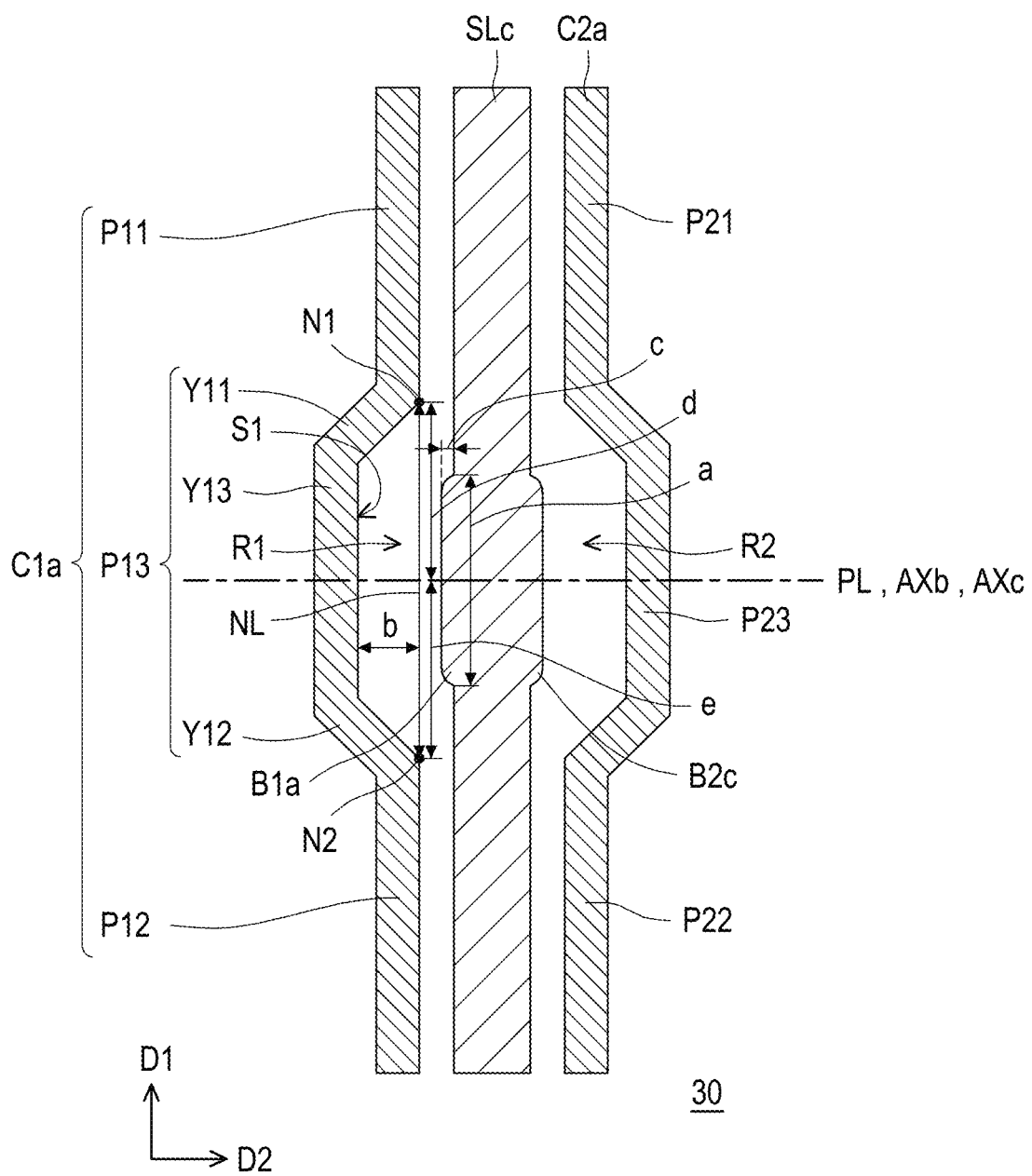
FIG. 3B illustrates a schematic magnified view of the area II of the display device 30 as shown in FIG. 3A.

FIG. 3A illustrates a schematic local plan view of the display device 30 according to an embodiment of this invention. FIG. 3B illustrates a schematic magnified view of the area II of the display device 30 as shown in FIG. 3A. In order to make the expression of drawing more concise, FIG. 3B schematically depicts the signal line SLc and the common electrode lines C1a and C2a only.

Compared to the display device 10 as shown in FIGS. 1A to 1C, the display device 30 as shown in FIGS. 3A and 3B is different in that two sides of the signal line SLc have a protrusion B1a and a protrusion B2c, respectively, each of which protrudes in a direction away from the signal line SLc, that the orthogonal projections of the two adjacent pixel electrodes PE1c and PE2c partially overlap with the orthogonal projection of the common electrode line C1a on the substrate SB and the orthogonal projection of the common electrode line C2a on the substrate SB, respectively, and that each of the pixel electrodes PE1c and PE2c has radial slits STc therein.

Referring to FIG. 3B, in this embodiment, it is possible that the protrusion B1a protrudes toward the common electrode line C1a and the protrusion B2c protrudes toward the common electrode line C2a so that the groove R1 of the bend segment P13 of the common electrode line C1a can correspondingly accommodate the protrusion B1a and the groove R2 of the bend segment P23 of the common electrode line C2a can correspondingly accommodate the protrusion B2c.

In this embodiment, the length of the protrusion B1a is not larger than the length of the bend segment P13, so that the groove R1 of the bend segment P13 can accommodate the protrusion B1a. Specifically, the linking line NL connecting i) the connection point N1 of the corresponding ends of the bend segment P13 and the first segment P11 and ii) the connection point N2 of the corresponding ends of the bend segment P13 and the second segment P12 in the first direction D1 has a length A, which is namely the length of the bend segment P13 in the first direction D1 and the width of the opening of the groove R1, and may satisfy $0 \le A \le 30$ μm (but this invention is not limited thereto). The length a of the protrusion B1a in the first direction D1 is not larger than the width A of the opening of the groove R1; that is, $a \le A$. In some embodiments, the lengths A and a satisfy $4 \mu m \le a \le A 30 \mu m$, but this invention is not limited thereto.

In some embodiments, the bend segment P13 may include two first inclined sections Y11 and Y12, and a first sub-segment Y13 arranged between and connected with the two first inclined sections Y11 and Y12, and there is a distance b between the side S1 of the first sub-segment Y13 facing the signal line SLc and the linking line NL in the second direction. In other words, there is a distance b between the side S1 of the "bottom" portion of the groove R1 facing the signal line SLc and the linking line NL. In some embodiments, the distance b satisfies $1.5 \mu m < b \le 6 \mu m$, but this invention is not limited thereto.

In this embodiment, the width c of the protrusion B1a protruding in the direction away from the signal line SLc may satisfy $0.25 \mu m \le c \le 2b$, but this invention is not limited thereto. In some embodiments, when a division line PL extends in the second direction D2 to pass the bend segments P13 and P23 to divide the length A of the linking line NL into a length d and a length e, the length A, the length d and the length e satisfy $A=d+e$, $0 \le d \le 15 \mu m$ and $0 \le e \le 15 \mu m$, but this invention is not limited thereto. In some embodiments, the division line PL may extend in the second direction D2 to pass at least one of the protrusions B1a and B2c. In some embodiments, the length d may be equal to the length e, but this invention is not limited thereto. In other embodiments, the length d may not be equal to the length e.

In some embodiments, the protrusions B1a and B2c can be formed in symmetry at the two sides of the signal line SLc, and the bend segments P13 and P23 can be arranged in symmetry on two sides of the signal line SLc with the signal line SLc as a symmetry axis, wherein the shape/dimension designs of the protrusion B2c and the bend segment P23 may refer to those of the protrusion B1a and the bend segment P13 as mentioned above.

Referring to FIG. 3A, in some embodiments, the common electrode lines C1a and C2a may be connected by a common electrode line C3b, wherein the orthogonal projection of the common electrode line C3b on the substrate SB overlaps with the orthogonal projection of the pixel electrode PE1c or PE2c on the substrate SB but does not overlap with the orthogonal projection of the signal line SLc on the substrate SB. In other words, the common electrode line C3b does not cross under the signal line SLc. In some embodiments, the display device 30 may also include common electrode lines C4. The common electrode line C4 may extend from the common electrode line C3b and overlaps with the pixel electrode PE1c or PE2c.

In this embodiment, each of the pixel electrode PE1c or PE2c may include a trunk BO1 extending in the first direction D1 and a trunk B02 extending in the second direction D2, wherein there may be a plurality of slits STc extending in parallel from the trunks BO1 and B02 toward the signal lines SLc. The extension direction of the slits STc crosses the first direction D1 and the second direction D2, so that the slits STc have a radial pattern as a whole. In this embodiment, the division line PL may extend along the trunk B02, but this invention is not limited thereto. In some embodiments, it is possible that the central axis of the trunk B02 coincides with the central axis AXc of the common electrode line C3b and the division line PL coincides with the central axis AXb of the trunk B02 in top view so that the length d is equal to the length e.

In the display device 30 according to an embodiment of this invention, by forming the two protrusions B1a and B2c respectively at the two sides of the signal line SLc, forming the portions of the common electrode lines C1a and C2a positionally corresponding to the two protrusions B1a and B2c into the outward expanding bend segments P13 and P23, and spacing apart the common electrode lines C1a and C2a between the pixel electrodes PE1c and PE2c, the orientation of the liquid crystal molecules can be stabilized, so that the display device 30 can have good display quality.

Figure 4:
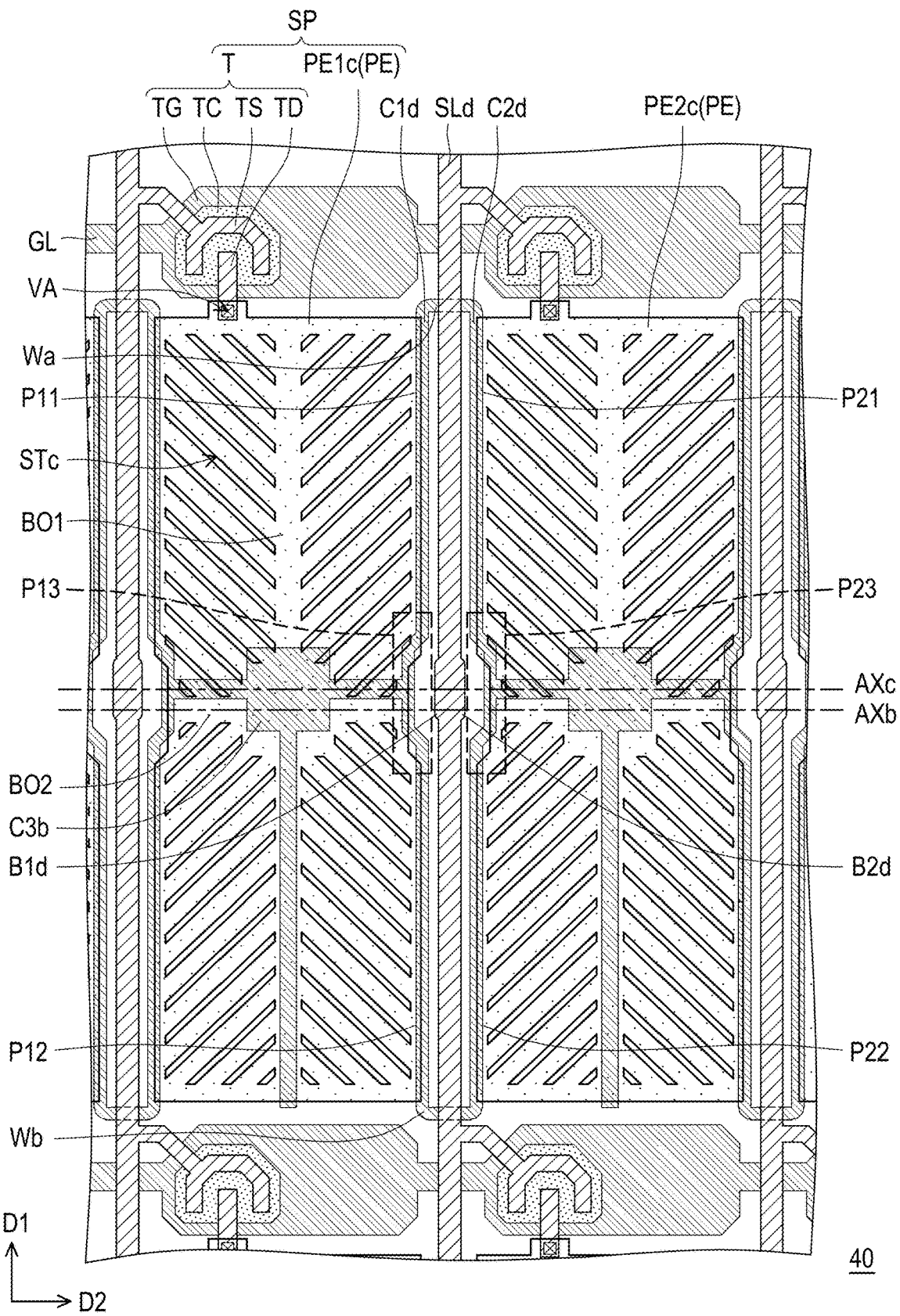
FIG. 4 illustrates a schematic local plan view of the display device 40 according to an embodiment of this invention.

FIG. 4 illustrates a schematic local plan view of the display device 40 according to an embodiment of this invention. Compared to the display device 30 as shown in FIGS. 3A and 3B, the display device 40 as shown in FIG. 4 is different in that the central axis AXb of the trunk B02 of the pixel electrode PE1c or PE2c does not coincide with the central axis AXc of the common electrode line C3b in top view.

For example, in this embodiment, the protrusions B1d and B2d of the signal line SLd, the bend segments P13 and P23 of the common electrode lines C1d and C2d and the common electrode line C3b in the display device 40 are shifted positively in the first direction D1 as compared to the display device 30 as shown in FIG. 3A, wherein the shape/dimension designs of the protrusions B1d and B2d may refer to the aforementioned shape/dimension design of the protrusion B1a of the display device 30 as shown in FIGS. 3A and 3B. As a result, while the division line PL coincides with the central axis AXb of the trunk B02 in top view, the length d is not equal to the length e.

In some embodiments, in the display device 40, it is possible that the first segment P11 of the common electrode line C1d is also connected with the first segment P21 of the common electrode line C2d via a conductive line Wa and the second segment P12 of the common electrode line C1d also connected with the second segment P22 of the common electrode line C2d via a conductive line Wb, so that the common electrode lines C1d and C2d are electrically connected with each other.

In the display device 40 according to an embodiment of this invention, by forming the two protrusions B1d and B2d respectively at the two sides of the signal line SLc, forming the portions of the common electrode lines C1d and C2d positionally corresponding to the two protrusions B1d and B2d into the outward expanding bend segments P13 and P23, and spacing apart the common electrode lines C1d and C2d between the pixel electrodes PE1c and PE2c, the orientation of the liquid crystal molecules can be stabilized, so that the display device 40 can have good display quality.

Figure 5:
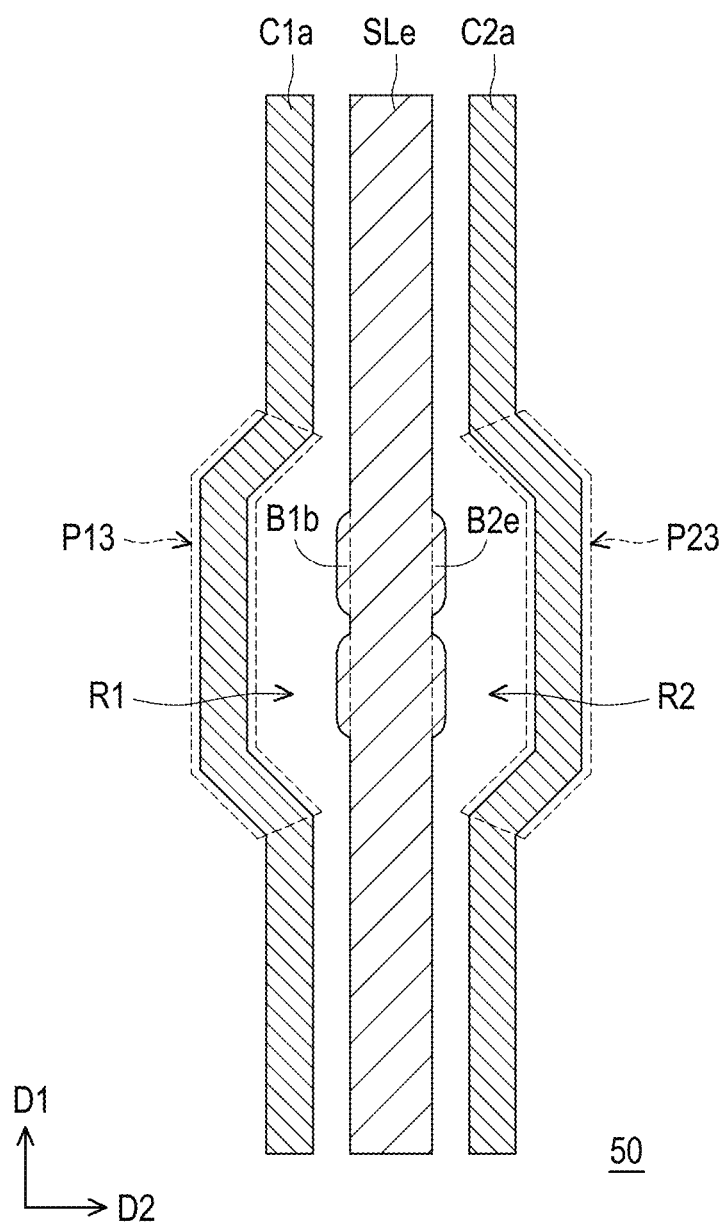
FIG. 5 illustrates a schematic local plan view of the signal line SLe and the common electrode lines C1a and C2a of the display device 50 according to an embodiment of this invention.

FIG. 5 illustrates a schematic local plan view of the signal line SLe and the common electrode lines C1a and C2a of the display device 50 according to an embodiment of this invention. Compared to the display device 20 shown in FIG. 2, the display device 50 as shown in FIG. 5 is different in that each side of the signal line SLe has two protrusions B1b or B2e protruding in the direction away from the signal line SLe.

In this embodiment, it is possible that the two protrusions B1b protrude toward the common electrode line C1a and the two protrusions B2e protrude toward the common electrode line C2a, so that the groove R1 of the bend segment P13 of the common electrode line C1a can correspondingly accommodate the two protrusions B1b and the groove R2 of the bend segment P23 of the common electrode line C2a can correspondingly accommodate the two protrusions B2e. The shape/dimension designs of the protrusions B1b and B2e may refer to the aforementioned shape/dimension design of the protrusion B1a in the display device 30 as shown in FIGS. 3A and 3B.

In the display device 50 according to an embodiment of this invention, by forming the four protrusions B1b and B2e at the two sides of the signal line SLe, forming the portions of the common electrode lines C1a and C2a positionally corresponding to the protrusions B1b and B2e into the outward expanding bend segments P13 and P23, and spacing apart the common electrode lines C1a and C2a between the pixel electrodes, the orientation of the liquid crystal molecules can be stabilized, so that the display device 50 can have good display quality.

Figure 6:
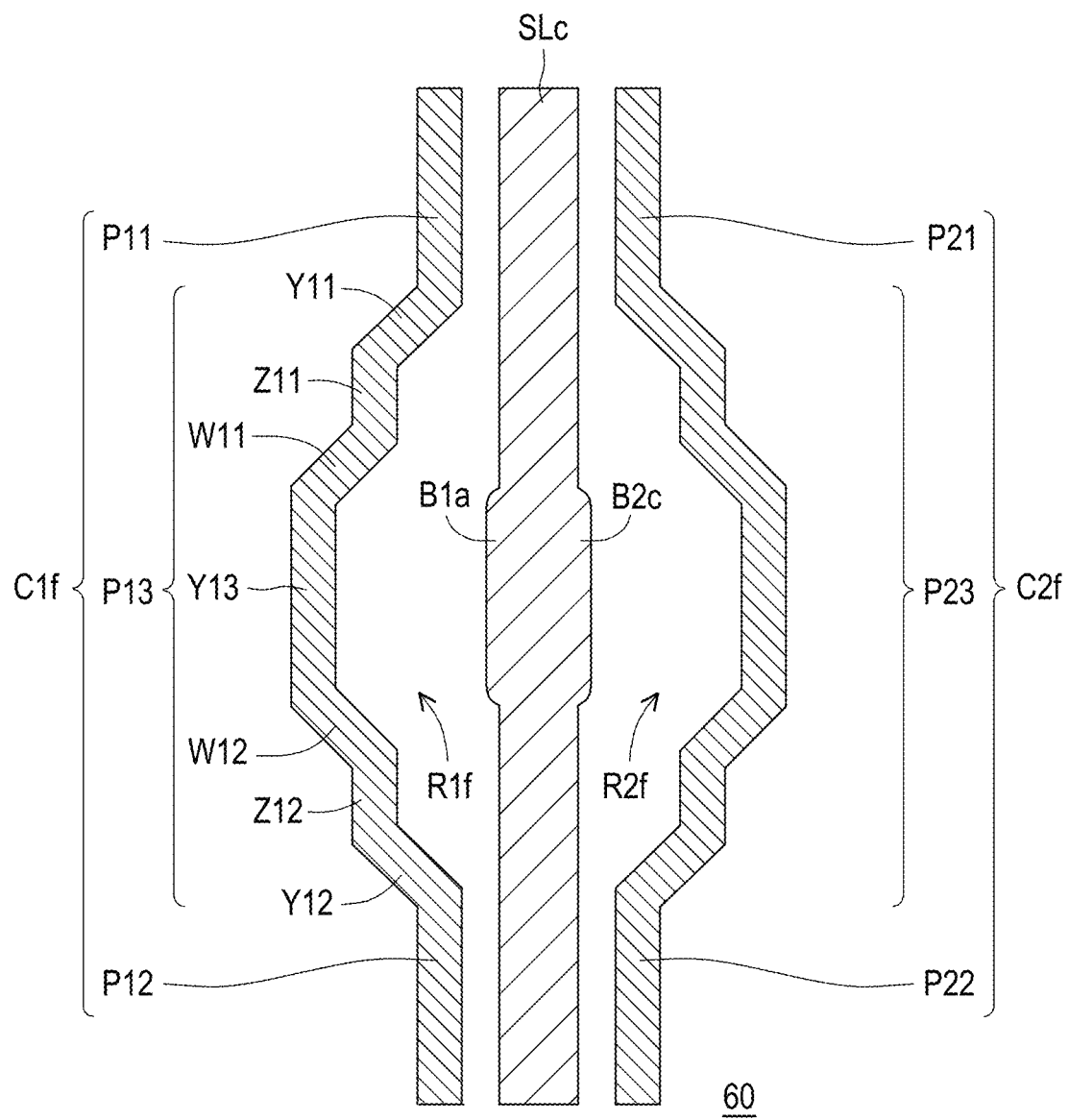
FIG. 6 illustrates a schematic local plan view of the signal line SLc and the common electrode lines C1f and C2f of the display device 60 according to an embodiment of this invention.

FIG. 6 illustrates a schematic local plan view of the signal line SLc and the common electrode lines C1f and C2f of the display device 60 according to an embodiment of this invention. Compared to the display device 30 shown in FIGS. 3A and 3B, the display device 60 as shown in FIG. 6 is different in that each of the bend segments P13 and P23 of the common electrode lines C1f and C2f has a multi-step groove R1f or R2f.

For example, in this embodiment, in addition to the two first inclined sections Y11 and Y12 and the first sub-segment Y13, the bend segment P13 may further includes two second inclined sections W11 and W12 and connection sections Z11 and Z12, wherein the connection section Z11 is located between and connecting the first inclined section Y11 and the second inclined section W11, the connection section Z12 is located between and connecting the first inclined section Y12 and the second inclined section W12, one end of the first sub-segment Y13 is connected with the first inclined section Y11 via the second inclined section W11 and the connection section Z11, and the other end of the first sub-segment Y13 is connected with the first inclined section Y12 via the second inclined section W12 and the connection section Z12. In addition, the respective shapes of the bend segments P13 and P23 may be substantially symmetric to each other with the signal line SLc as a symmetry axis, but this invention is not limited thereto. As a result, the bend segment P13 has a multi-step groove shape of which the notch facing the signal line SLc, and the groove R1f of the bend segment P13 positionally corresponds to the protrusion B1a of the signal line SLc, so that the groove R1f can accommodate the protrusion B1a. Similarly, the bend segment P23 has a multi-step groove shape of which the notch facing the signal line SLc, and the groove R2f of the bend segment P23 positionally corresponds to the protrusion B2c of the signal line SLc, so that the groove R2f can accommodate the protrusion B2c.

In the display device 60 according to an embodiment of this invention, by forming the two protrusions B1a and B2c respectively at the two sides of the signal line SLc, forming the portions of the common electrode lines C1f and C2f positionally corresponding to the protrusions B1a and B2c into the outward expanding bend segments P13 and P23, and spacing apart the common electrode lines C1f and C2f between the pixel electrodes, the orientation of the liquid crystal molecules can be stabilized, so that the display device 60 can have good display quality.

Figure 7:
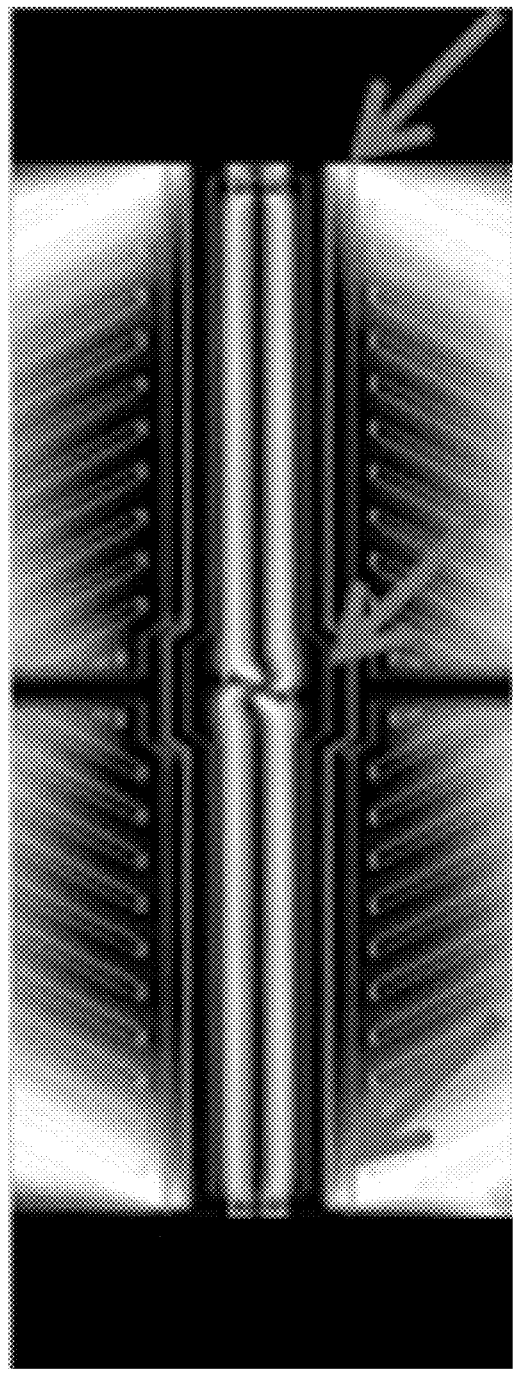
FIG. 7 illustrates a simulation result of liquid crystal orientation of the display device 30 as shown in FIG. 3A and FIG. 3B, wherein A was about 16 μm, a was about 5 μm, b was about 2 μm, c was about 0.25 μm, d was equal to e and was about 8 μm.

FIG. 7 illustrates a simulation result of liquid crystal orientation of the display device 30 as shown in FIG. 3A and FIG. 3B, wherein A was about 16 µm, a was about 5 µm, b was about 2 µm, c was about 0.25 µm, d was equal to e and was about 8 µm. As indicated by FIG. 7, the design that the bend segments P13 and P23 of the common electrode lines C1a and C2a each expand outward by 2 µm and respectively positionally correspond to the protrusions B1a and B2c of the signal line SLa can stabilize nodes.

Figure 8:
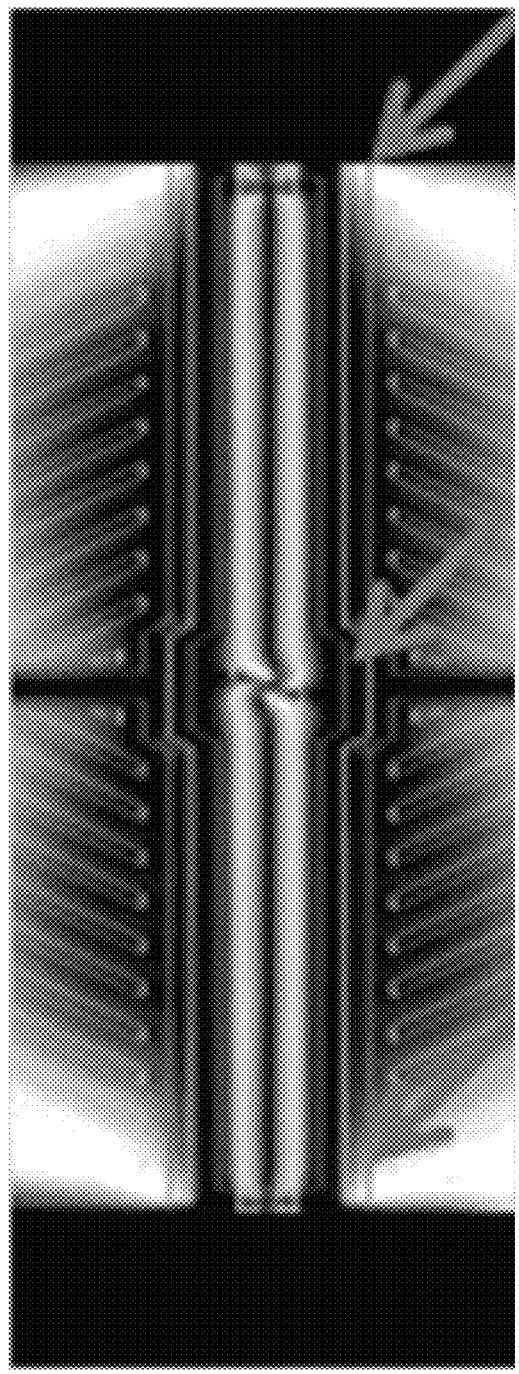
FIG. 8 illustrates a simulation result of liquid crystal orientation of the display device 30 as shown in FIG. 3A and FIG. 3B, wherein A was about 16 μm, a was about 5 μm, b was about 6 μm, c was about 0.25 μm, d was equal to e and was about 8 μm.

FIG. 8 illustrates a simulation result of liquid crystal orientation of the display device 30 as shown in FIG. 3A and FIG. 3B, wherein A was about 16 µm, a was about 5 µm, b was about 6 µm, c was about 0.25 µm, d was equal to e and was about 8 µm. As indicated by FIG. 8, the design that the bend segments P13 and P23 of the common electrode lines C1a and C2a each expand outward by 6 µm and respectively positionally correspond to the protrusions B1a and B2c of the signal line SLa can stabilize nodes.

Figure 9:
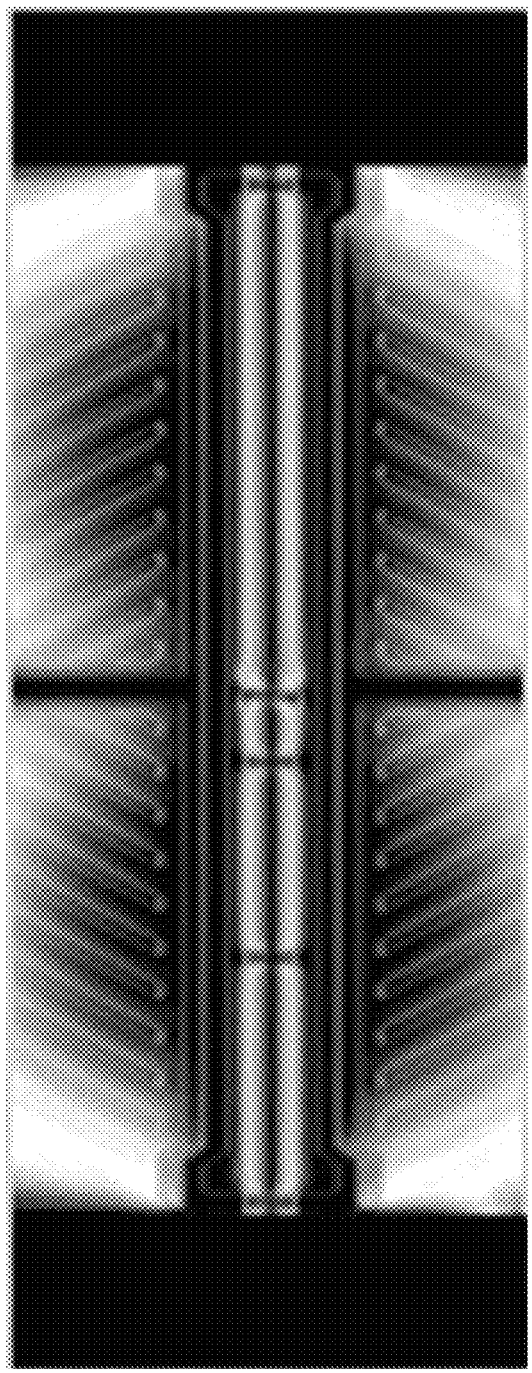
FIG. 9 illustrates a simulation result of liquid crystal orientation of a display device close to the display device 30 as shown in FIG. 3A and FIG. 3B, wherein A was about 16 μm, a was about 5 μm, b was 0 μm, c was about 0.25 μm, d was equal to e and was about 8 μm.

FIG. 9 illustrates a simulation result of liquid crystal orientation of a display device close to the display device 30 as shown in FIG. 3A and FIG. 3B, wherein A was about 16 µm, a was about 5 µm, b was 0 µm, c was about 0.25 µm, d was equal to e and was about 8 µm. As indicated by FIG. 9, even the signal line SLc has the protrusions B1a and B2c, nodes still cannot be stabilized in absence of a bend segment of the common electrode lines C1a and C2a.

Figure 10:
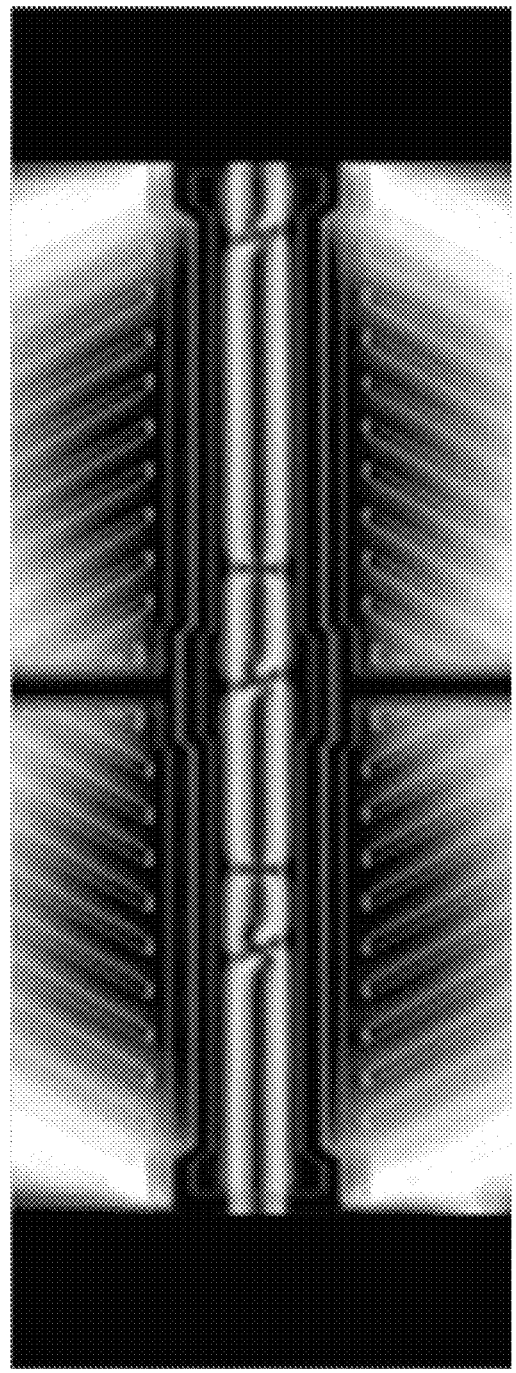
FIG. 10 illustrates a simulation result of liquid crystal orientation of a display device close to the display device 30 as shown in FIG. 3A and FIG. 3B, wherein A was about 16 μm, a was about 5 μm, b was about 1.5 μm, c was about 0.25 μm, d was equal to e and was about 8 μm.

FIG. 10 illustrates a simulation result of liquid crystal orientation of a display device close to the display device 30 as shown in FIG. 3A and FIG. 3B, wherein A was about 16 µm, a was about 5 µm, b was about 1.5 µm, c was about 0.25 µm, d was equal to e and was about 8 µm. As indicated by FIG. 10, even though the signal line SLc has the protrusions B1a and B2c and the common electrode lines C1a and C2a have the bend segments P13 and P23, the outward expansion width of 1.5 µm of the bend segments P13 and P23 is still insufficient to make nodes stabilized.

Figure 11:
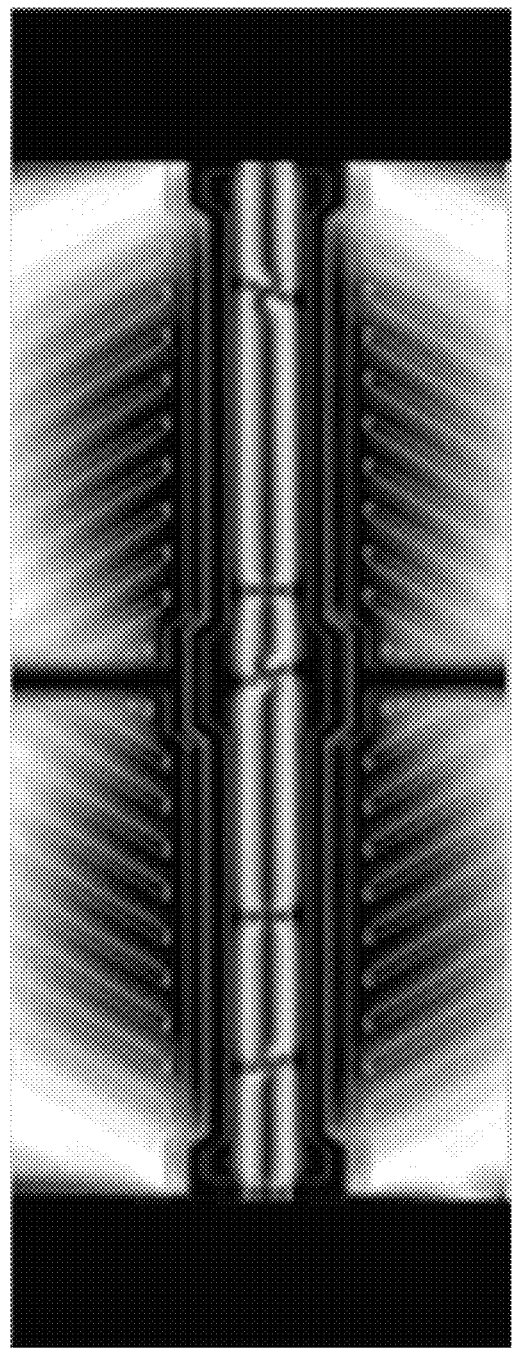
FIG. 11 illustrates a simulation result of liquid crystal orientation of a display device close to the display device 30 as shown in FIG. 3A and FIG. 3B, wherein A was about 16 μm, a was about 5 μm, b was about 2 μm, c was 0 μm, d was equal to e and was about 8 μm.

FIG. 11 illustrates a simulation result of liquid crystal orientation of a display device close to the display device 30 as shown in FIG. 3A and FIG. 3B, wherein A was about 16 µm, a was about 5 µm, b was about 2 µm, c was 0 µm, d was equal to e and was about 8 µm. As indicated by FIG. 11, even though the bend segments P13 and P23 of the common electrode lines C1a and C2a each expand outward by 2 µm, nodes still cannot be stabilized in absence of a protrusion of the signal line.

In summary, in the display device of this invention, by forming at least one protrusion at at least one side of the signal line, forming the portions of the common electrode lines positionally corresponding to the at least one protrusion into outward expanding bend segments, and spacing apart the common electrode lines between the pixel electrodes, the orientation of the liquid crystal molecules can be stabilized to form stable nodes, so that the display device can have good display quality.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

The invention claimed is:

1. A display device, comprising:
   two adjacent pixel electrodes disposed on a substrate, wherein the two adjacent pixel electrodes are spaced apart from each other by a gap extending in a first direction, a width of the gap in a second direction is smaller than a half of a width of any one of the two adjacent pixel electrodes in the second direction, and the second direction crosses the first direction;
   at least one signal line, disposed on the substrate and extending in the first direction, wherein an orthogonal projection of the at least one signal line on the substrate falls within an orthogonal projection of the gap on the substrate, the at least one signal line is electrically connected with at least one of the two adjacent pixel electrodes, the at least one signal line has at least one protrusion at at least one side thereof, and the at least one protrusion protrudes in a direction away from the at least one signal line; and
   two adjacent common electrode lines disposed on the substrate, wherein
      an orthogonal projection of one of the two adjacent common electrode lines on the substrate is located between an orthogonal projection of the at least one signal line on the substrate and an orthogonal projection of one of the two adjacent pixel electrodes on the substrate,
      an orthogonal projection of the other of the two adjacent common electrode lines on the substrate is located between the orthogonal projection of the at least one signal line on the substrate and an orthogonal projection of the other of the two adjacent pixel electrodes on the substrate,
      the two adjacent common electrode lines are spaced apart from each other and extend in the first direction, and
      each of the two adjacent common electrode lines includes a first segment, a second segment, and a bend segment located between and connecting with the first segment and the second segment, wherein the bend segment bends away from the at least one signal line, the at least one protrusion positionally corresponds to the bend segment of each of the two adjacent common electrode lines, and a length of the at least one protrusion is not more than a length of the bend segment.

2. The display device of claim 1, wherein
   two ends of the bend segment are connected with an end of the first segment and an end of the second segment, respectively, at a first connection point and a second connection point, respectively, and the length of the bend segment is a length A of a first linking line linking the first connection point and the second connection point in the first direction, and
   the length A of the first linking line and a length a of the at least one protrusion in the first direction satisfy 4 µm≤a≤A30 µm.

3. The display device of claim 2, wherein
   the bend segment includes two first inclined sections, and a first sub-segment located between and connecting with the two first inclined sections, wherein a first distance b between a side of the first sub-segment facing the at least one signal line and the first linking line in the second direction satisfies 1.5 µm<b≤6 µm.

4. The display device of claim 3, wherein a width c of the at least one protrusion in the second direction satisfies 0.25 µm≤c≤2b.

5. The display device of claim 3, wherein the bend segment further comprises two second inclined sections and two connection sections, wherein
   one of the two connection sections is located between and connects one of the first inclined sections and one of the second inclined sections,
   the other of the two connection sections is located between and connects the other of the first inclined sections and the other of the second inclined sections,
   one of two ends of the first sub-segment is connected with one of the first inclined sections via one of the second inclined sections and one of the connection sections, and
   the other of the two ends of the first sub-segment is connected with the other of the first inclined sections via the other of the second inclined sections and the other of the connection sections.

6. The display device of claim 2, wherein a division line extending in the second direction and passing the bend segment divides the length A of the first linking line into a first length d and a second length e, and the length A, the first length d and the second length e satisfy A=d+e, 0<d≤15 µm, and 0<e≤15 µm.

7. The display device of claim 6, wherein the division line passes the at least one protrusion in top view.

8. The display device of claim 6, wherein the first length d is not equal to the second length e.

9. The display device of claim 6, wherein the first length d is equal to the second length e.

10. The display device of claim 6, wherein at least one of the two adjacent pixel electrode has a plurality of slits therein and includes a trunk extending in the second direction, and the division line passes the trunk in top view.

11. The display device of claim 10, wherein the division line coincides with a central axis of the trunk in top view.

12. The display device of claim 1, wherein the at least one protrusion comprises a plurality of protrusions, and the protrusions positionally correspond to the bend segment of each of the two adjacent common electrode lines.

13. The display device of claim 12, wherein the protrusions are arranged at two sides of the at least one signal line.

14. The display device of claim 1, wherein at least one of the two adjacent pixel electrode has a plurality of slits therein.

15. The display device of claim 1, wherein the at least one signal line is at least one data line.

16. The display device of claim 1, wherein the orthogonal projections of the two adjacent common electrode lines on the substrate are located outside of the orthogonal projections of the two adjacent pixel electrodes on the substrate.

17. The display device of claim 1, wherein the orthogonal projections of the two adjacent common electrode lines on the substrate partially overlap with the orthogonal projections of the two adjacent pixel electrodes on the substrate.

18. The display device of claim 1, wherein the two adjacent common electrode lines are electrically connected with other.

* * * * *